Nov. 22, 1938.  K. K. SHEPARD  2,137,592
RECORDING INSTRUMENT
Filed Jan. 8, 1936   2 Sheets-Sheet 1

Inventor
Kelvin K. Shepard
By Herbert M. Birch
Attorney

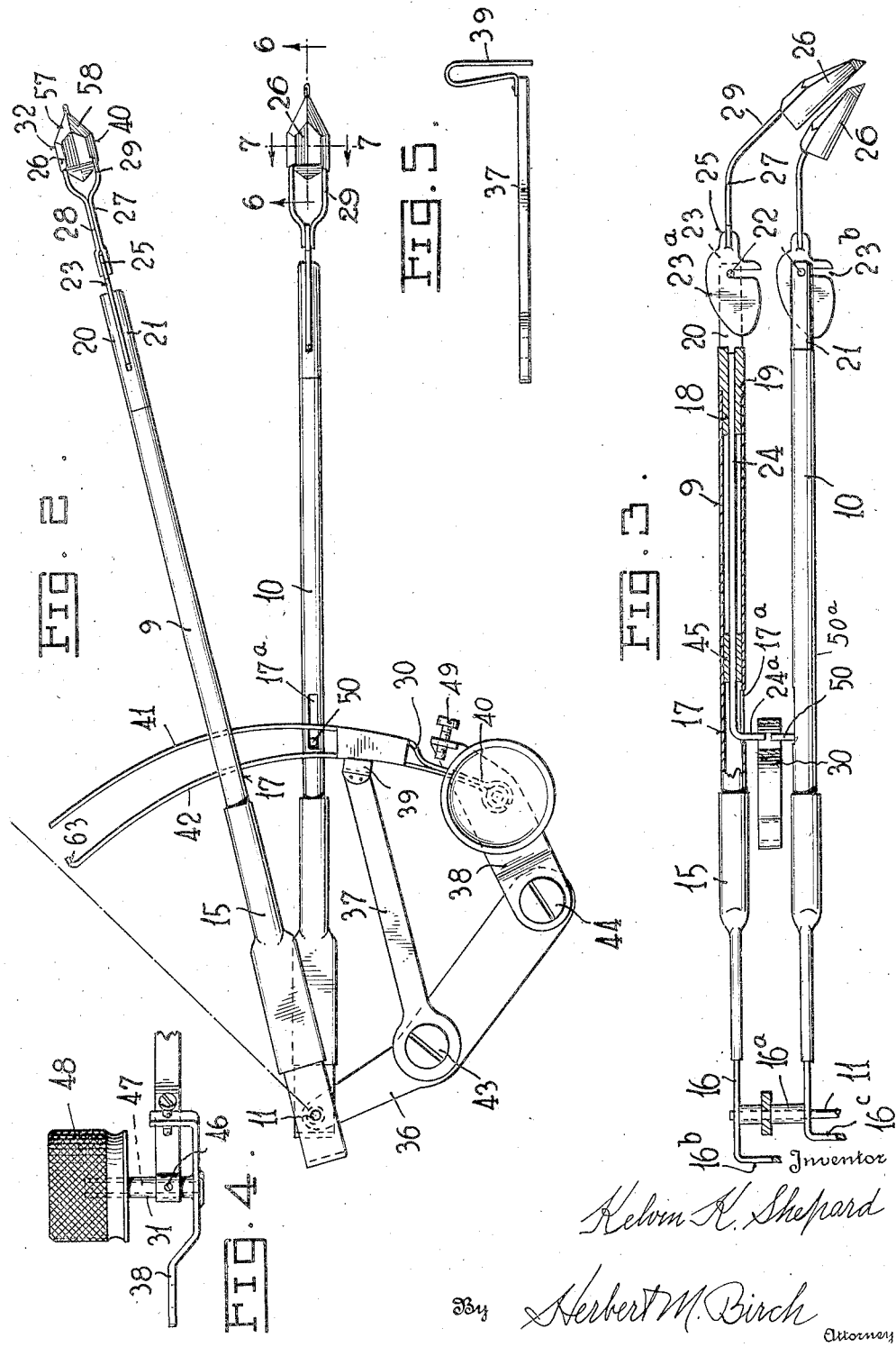

Patented Nov. 22, 1938

2,137,592

UNITED STATES PATENT OFFICE 2,137,592

RECORDING INSTRUMENT

Kelvin K. Shepard, Washington, D. C., assignor of two-thirds to Herbert M. Birch, Bethesda, Md.

Application January 8, 1936, Serial No. 58,208

11 Claims. (Cl. 234—72)

This invention relates to indicating and measuring instruments of the recording type, and more particularly to the recording instrument marking mechanism and operating means for said marking mechanism.

One object of my invention is to provide an improved operating mechanism for effecting engagement and disengagement between the pen or other marking device and the record sheet of the instrument.

A second object of my invention is to provide a pen assembly that may be quickly taken apart for cleaning or other adjustments such as clock changing if used with a clock rotated chart.

A third object of my invention is to provide a remote control means for raising and lowering the pens from the chart and to so calibrate the prime mover for raising and lowering the pens that the said pens in their raised positions will be equi-distant at any point over the chart.

A fourth object of my invention is to produce a constant minimum amount of frictional contact between the chart and the pen, whereby the accuracy of the recording is materially increased and regardless of the chart level.

And a fifth object of my invention is to provide an improved chart base, whereby certain defects, hereinafter named, may be overcome and certain formerly necessary parts eliminated for superior results.

In recording instruments of this type it has always heretofore been necessary to provide a solid disk base to support the record chart in a perfectly level plane, otherwise the pen arms which are of flat spring metal must be continually adjusted for accuracy. Any dips or depressions in the chart surface with a pen of the spring arm type results in an uneven and inaccurate line and also varies the tension and frictional contact of the pen with the chart.

Also, when the old type recording instruments are exposed to weather conditions, especially damp weather, the charts during the recording operation stick to the conventional disk base support and free rotation of the chart is prevented, and the chart will become distorted and seriously impair the accuracy of the record.

With my invention I may now get more accurate records with a horizontal instrument which has many advantages over the old type vertical instrument. But should the conditions require a vertically positioned instrument, I can by a very slight modification involving no material change in structure produce a vertical recorder, which will be equally as efficient in operation in damp weather though not desirable for housing in small pits as the chart would be in too difficult a position to read from above. It is very desirable to place these recording instruments below the ground in small pits along the city streets at necessary points to keep close check on gas pressure, electric current, etc. Before my invention with its novel pen raising and lowering mechanism there was no gauge that could be confined in a pit, as the chart changing operation involved many more steps which necessitated much more space than that afforded by a small unobtrusive pit in the ground, and the gauges were constructed for vertical operating position. To use these old type vertical gauges it is necessary to pay rent for advantageous locations not objected to by the municipality, which are protected from dampness and other weather conditions, but now with my invention I am able to eliminate much of this expense by using small unobtrusive pits in the sidewalks or streets of the city.

My invention may be more completely understood by referring to the accompanying drawings, in which:

Figure 2 is a top or front elevation of my pen arms and operating means for raising and lowering the same, on an enlarged scale, apart from the pressure gauge.

Figure 3 is a side elevation with one pen arm partly broken away to illustrate the raising and lowering mechanism.

Figure 4 is a side elevation partly cut away of the operating knob and its mountings.

Figure 5 is a side elevation of a cushion kick-off spring and its supporting bracket which co-operates with the raising and lowering mechanism.

Figure 1:
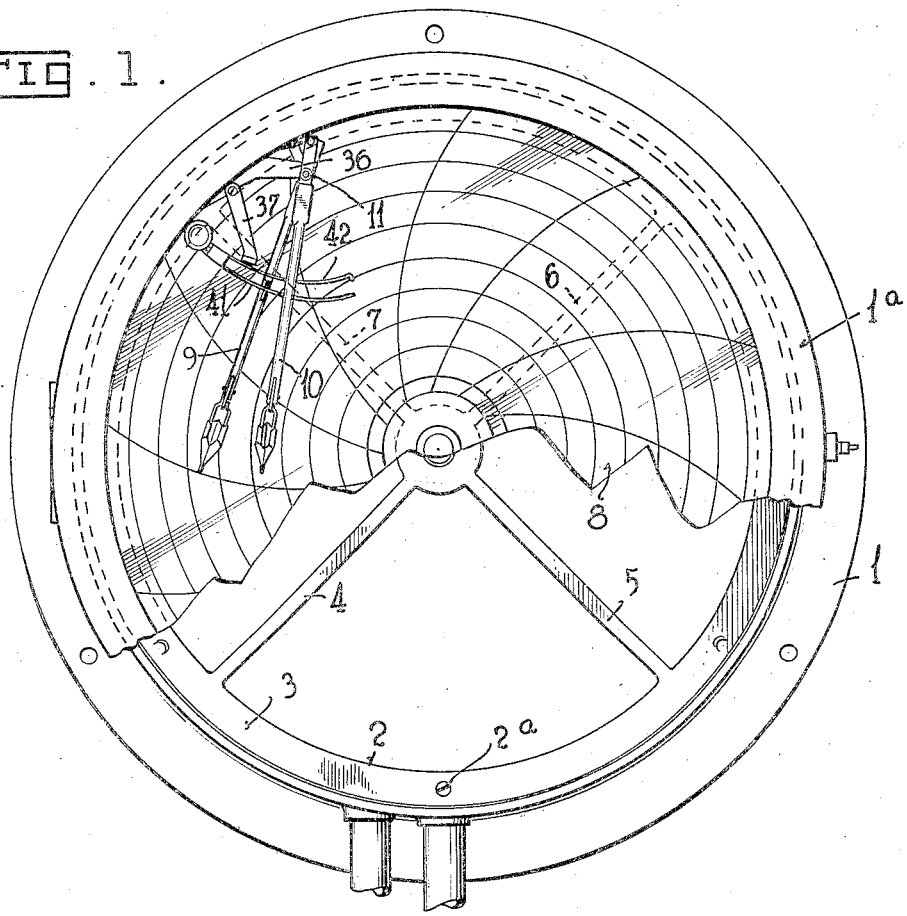
Figure 1 is a top or front elevation of a recording pressure gauge partly broken away to show the chart supporting base and general assembly.

Referring more specifically to the drawings, the assembled view shown in Figure 1 comprises a casing 1 which may have a lid or cover 1a of any suitable construction to protect the polar chart 8. The chart 8 is adapted to be rotated by any suitable means such as a clock, not shown, and is supported by a new and improved rest or base 2, which is fastened by small bolts 2a to a narrow inwardly extending flange of casing 1.

The chart base 2 is specially designed to prevent binding or sticking of the chart and to provide for a minimum surface of contact with the chart 8 and yet allow for efficient supporting surface during the recording operation. This is accomplished by constructing the base 2 in the shape of a wheel with a rim 3 and radial spokes 4, 5, 6 and 7, the number of spokes being optional, which supports the chart 8 in lieu of the usual solid metal disk support.

Mounted on a bracket 36 supported by the casing 1 at the periphery of the circular chart 8, shown in Figure 1, are upper and lower pen arms 9 and 10, which are adapted to swing on a common pivot pin 11 disposed at right angles with the bracket 36 and extending upward vertically therefrom. As the pen arms 9 and 10 are both identical in construction a description of one will suffice. The pen arm 9, for instance, consists of a short tube 15, a long tube 17 and a flat metal portion 16 in engagement with the pivot pin 11. The short tube 15 is slightly larger in diameter than the long tube 17 and the width of the flat metal portion 16 and acts as a connecting means or link between the flat portion 16 and the tube 17. An end of the flat portion 16 and the long tube 17 are forced within the bore of the tube 15 at opposite ends of the tube 15. The end of the tube 15 which encloses the flat portion 16 is then pressed flat to conform to the flat portion 16 which portion extends substantially half way through the bore of tube 15 to the end of long tube 17 forced in the tube 15 from the other end. This distorting of tube 15 to conform to flat portion 16 will also tend to press against the end of tube 17 and bind the said tube tightly within the tube 15 to prevent any danger of it becoming loose and resulting in any variation in the radius of swing of the pen arm. The flat portions 16 of the upper and lower pen arms 9 and 10 have aligned openings for engagement with the pivot 11 and extend beyond the pivot 11 a short distance when they are bent downwardly at right angles at 16b and 16c to the operating pressure elements not shown. At this point it might be said that the pen arms are spaced apart on the pivot 11 by a bushing 16a. The long tube 17 extending from the short tube 15 has a hollow bushing 18 with a nipple or reduced portion which engages within the bore of the tube 17 and an enlarged shoulder portion 19 of a diameter equal to the outside diameter of the tube 17. The enlarged portion 19 of the hollow bushing 18 is slotted vertically from the outer end approximately two-thirds of its length to form opposed parallel arms 20 and 21, the ends of which are joined together by a transversely extending pin 22 in a plane parallel to the chart 8. This pin serves as the fulcrum or pivotal point for a slotted skull shaped cam head 23. The slotted cam head 23 is adapted to rest upon the pin 22 by gravity and is slotted at 23b from the under edge of the cam head at the proper point to provide for a substantially even balance and thereby permit free tilting or rocking of the cam head 23 on the pivot 22. The weight of the pen holder 29 and the pen 26 will hold the said cam head 23 in tilted recording position and when engaged on its rounded upper edge or cam edge 23a by the cam rod 24 will rock said head to non-recording position. The reciprocating cam rod 24, the pen 26 and the pen holder 29 are fully described hereinafter. The cam head 23 as has been said is slotted from its under age so that it may be dropped down over the pivot pin 22. This permits the ready removal from the pin 22 or attachment of the cam head 23 with the pin 22. The cam head 23 is the pivot and primary controlling element for pen 26 and has a nose portion 25. Soldered on each side of the nose portion are contacting arms 27 and 28 which are formed from a piece of resilient wire having a downwardly sloping front loop 29 with which the pen 26 frictionally engages. The loop 29 has a normal tendency to spread when in engagement with the side flanges 32 and 40 of the pen 26, and makes a tight frictional connection with the said pen for operation. With this arrangement the pen 26 can readily be removed for cleaning or replacement with respect to the holder loop 29 by merely sliding it on or off. The contacting arms 27 and 28 extend from the nose portion 25 of cam 23 in line with the pen arm assembly a short distance and then bend downwardly and outwardly from the end of the pen arm at an angle into the loop portion 29 which carries the pen 26 for engagement with the surface of chart 8. As the pen arms are placed one directly above the other on the same pivot 11 the length of the pen supporting loop 29 and the arms 27 and 28 must be varied with respect to each other to provide for the proper clearance during operation, the upper pen 26 extending slightly beyond the lower one. The cam head 23 is balanced on the pivot pin 22 so as to allow the weight of the pen 26 combined with the weight of the pen holder loop 29 to be the only means for normally maintaining contact by gravity with the chart 8, the pen arms 9 and 10 being rigid and supported on pivot pin 11. The weight of the pen and the pen holder loop is very slight due to the light material from which they are made and as a result accordingly the actual contact with the chart is exceptionally light and permits instant response to the slightest fluctuations in pressure or actuating force, assuring greater recording accuracy.

In combination with the cam head 23 is an L-shaped cam rod or plunger 24 which extends longitudinally through bushing 18 from flush with the end of the enlarged shoulder portion 19 of said bushing 18 through a bearing 45 mounted in the tube 17 to the end of an elongated slot 17a formed in the bottom of said tube 17 near the point where it joins with the tube 15. The leg portion 24a extends downwardly through the slotted portion 17a to a point just short of midway between the upper pen arm 9 and the lower pen arm 10 for engagement with a calibrated arcuate shaped fork 30.

Fastened to the bracket 36 which supports the pivot 11 and the pen arms 9 and 10 by bolts 43 and 44 are supplemental brackets 37 and 38. Supplemental bracket 37 extends inwardly over the chart 8 at an angle from the main supporting bracket 36 and has secured to its end a phosphorous metal spring 39 which extends upwardly in a loop of substantially inverted U-shape. The spring 39 should more properly be called a cushion kick-off spring for the calibrated raising and lowering arcuate shaped fork 30. The arcuate fork 30 is pivoted to swing on the supplemental bracket 38 supported on the main bracket 36 by bolt 44 and extends inwardly across the chart on a line trending slightly toward the bracket 37 to which the spring 39 is secured, but of shorter length than bracket 37. The knob 48 for moving the arcuate shaped fork 30 is mounted around a sleeve 31, see Figure 4, and locked to the said sleeve 31 by a small set screw 46 whereby the said fork may be adjusted vertically on the sleeve 31. The sleeve 31 is loosely fitted around an upright pivot pin 47 and extends slightly beyond the upper end of pin 47 within the said sleeve. The pin 47 is suitably secured to bracket 38 on which the sleeve 31 rests around the said pin 47. Over the end of the said sleeve 31 is secured a knurled knob 48 to facilitate swinging the arcuate fork 30 and the sleeve 31 on the pivot pin 47.

The arcuate shaped fork 30 is a manually operated raising and lowering device or if desired it may be operated automatically for raising and lowering the pens 26; and operates in combination with the leg 24a to transmit reciprocating movement thereto. The leg 24a extends downwardly from the slotted portion 17a of tube 17 and the corresponding leg 50 extends upwardly from the corresponding lower tube 50a. The said leg 50 extends upwardly in alignment with the leg 24a to a point just short of mid-way between the upper and lower pen arms 9 and 10, so as to provide for clearance of a fraction of an inch between the ends of the respective legs 24a and 50. This is made possible due to the fact that the tube 50a of the lower pen arm 10 is slotted along its top portion opposite the slotted portion 17a of tube 17 in reverse duplicate.

The arcuate shaped fork or releasing cam 30 is constructed from one continuous piece of rigid metal tape looped around the circumference of the sleeve 31, and pinched together at 40 on one side of the said sleeve 31. From the point 40 on the sleeve 31 the fork 30 extends inwardly over the surface of the chart 8 in a predetermined arc, with especial care to make the said arc a true part of a circle the diameter of which depends upon the length of the pen arms. At the extremity of the pinched portion 40, the fork 30 has an arm or tine 41 offset from the arm or tine 42, both of which arms are arcs of circles of equal diameters; but the center points of the respective circles are spaced apart slightly to make the arms 41 and 42 diverge proportionately across the chart 8 intermediate the said chart's periphery or circumference and center point for raising and lowering the pens 26 of the upper and lower pen arms 9 and 10 simultaneously. The arm 41 retracts the plunger or cam rods of the pen arms and the arm 42 projects the said rods forward against the cam edge 23a of the cam head 23 for raising the respective pens.

When the releasing cam fork 30 is turned anticlockwise on its pivot pin 47 to retract the cam rod 24 out of engagement with cam head 23 to permit the pen 26 to drop by gravity and contact the chart 8 for operation, the said rod 24 is pulled backward through the hollow tube 17 and slot 17a until the arm 42 strikes the spring 39. This operation is duplicated on the lower pen arm assembly at the same instant as explained, hereinbefore. Then as the fork arm 42 strikes the downwardly extending leg portion of the inverted U-shaped spring 39, the spring 39 will cushion and give so that when the operator releases his grip on the knob 48 the said spring will return to its normal position and kick-off the fork arm 42. The leg 24a which was in contact with said arm 41 during this entire operation will now no longer be in contact with said arm 41, but will rest at the end of the slot 17a between the two arms 41 and 42 and out of contact with them. This feature of my invention is very important as it prevents the said arcuate fork 30 from contacting the leg 24a of cam rod 24 during the recording operation. If the fork 30 were permitted to remain in contact with the leg 24a, it is obvious that the movement of the pen arms would be interfered with and impair the accuracy of the recording or marking operation.

The supplemental bracket 38 has an upturned end facing the pinched portion 40 of arcuate fork 30 and has threaded through it a small bolt 49. The bolt 49 may be threaded inwardly or outwardly to limit the swing of the said fork 30 on its pivot, whereby the thrust of the cam rods of the respective pen arms 9 and 10 may be lengthened or shortened and the height to which the pens may be raised regulated. The arms 41 and 42 of the arcuate fork 30 extend across the chart and may be swung on pivot pin 11 to and from zero over the chart, as indicated by the dotted line in Figure 2, so as to permit raising or lowering the pens at any position over the chart surface. The end of arm 42 is curved inwardly a short distance at 63 and will tend to retain the pen arms 9 and 10 between arms 41 and 42, by engaging with the depending legs 24a and 50 of the cam rods.

Figure 6:
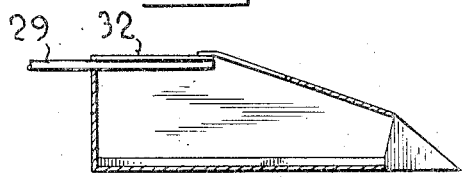
Figure 6 is a longitudinal section view of one of my pens along the line 6—6 of Figure 2.
Figure 7:
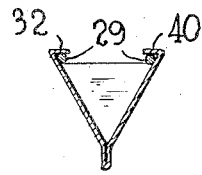
Figure 7 is a transverse section view of a pen of the type essential to efficient operation in combination with my construction along the line 7—7 of Figure 2.

The pens 26, illustrated in detail in Figures 6 and 7 are designed for use exclusively in combination with the raising and lowering mechanism, hereinbefore described. It is essential to use a box pen of this construction or one involving the same principles in order to prevent spilling of the ink when the pens are in their raised position above the chart. Also, it is necesasry to construct a pen that will write an exceptionally fine line and have an even and continuous capillary or thread-like flow of ink while in writing position.

In operation, assuming the chart 8 is to be removed and the pens are in operating position and in contact with the chart 8. The operator merely has to swing the fork 30 on its pivot pin 47 in a clockwise direction toward the pens. The arm 42 of the said fork 30 engages the legs 50 and 24a and feeds the cam rods, both as 24, forward until they project from the ends of the pen arms 9 and 10 and cam against the cam edges 23a of cam heads 23. When the said cam rods contact the cam edges 23a the head 23 is rocked on pivot pin 22 and tilted with the nose portion 25 upward to raise the said pens from the chart 8. As the pens themselves are closed on all sides except for the filling opening in the top rear portion they will not spill or dump any ink on the chart regardless of the angle to which they are tilted. The fork 30 and its respective arms 41 and 42 are sufficiently long and proportioned so that the said pens will be raised an equal height from the chart at any point from zero on. After the pens are thus raised the chart may be removed and replaced with a new one, etc.

The lowering of the pens is accomplished by turning the fork 30 anti-clockwise and the arm 41 engages with the legs 50a and 24 to retract the cam rods of the respective pen arms 9 and 10 from engagement with the cam heads 23. This permits the said cam heads 23 to return to their normal operating position due to the weight of the loop holder 29 and the pens which are just sufficient in weight to unbalance the cam heads on their pivots. The cam rods are carried back by the arm 41 until the arm 42 strikes the cushion kick-off spring 39. The spring 39 will then kick off the arm 42 and throw the entire fork 30 out of engagement or contact with any part of the pen arms and thereby permit the recording and marking operation to be resumed unhindered.

While certain features of the present invention are more or less specifically described, I wish it understood that various changes may be resorted to within the scope of the appended claims.

What I claim is:—

1. A marking means for recording instruments comprising a marker arm, a marking device holder, a marking device carried by said holder, a cam member carried by said holder, pivotal means carried by said marker arm to pivotally support said cam member, and means carried by said marker arm engageable with said cam member to move said marking device to inoperative position.

2. A marking means for recording instruments comprising an elongated arm, a marking device holder, a marking device carried by said holder, said elongated arm having an elongated slot in the outer end thereof, a pin carried by said arm extending across said slot, a combined cam and weight member secured to said holder and engaging said pin to pivotally secure said holder on said arm, and means carried by said arm engageable with said combined cam and weight member to move said marking device to inoperative position.

3. A marking means for recording instruments comprising an elongated arm, a holder, a marking device carried by said holder, said elongated arm having an elongated slot in the outer end thereof, a pin carried by said arm extending across said slot, a combined cam and weight member secured to said holder and engaging said pin to pivotally secure said holder on said arm, a releasing member for said marking device, and means for slidably mounting said releasing member on said elongated arm in a position for engagement with said combined cam and weight member.

4. A marking means for recording instruments comprising a marking device arm, a holder, a marking device carried by said holder, said arm having an elongated slot in the outer end thereof, a pin carried by said arm extending across said slot, a combined cam and weight member secured to said holder and engaging said pin to pivotally secure said holder on said arm, a releasing member for said marking device, means for slidably mounting said releasing member on said arm in a position for engagement with said combined cam and weight, a releasing cam, and means for mounting said releasing cam in a position for engagement with said releasing member.

5. A marking means for recording instruments comprising a pen arm, a pen holder, a pen carried by said holder, a combined cam and counter-balancing member secured to the inner end of said holder, means for pivotally securing said combined cam and counterbalancing member on the outer end of said arm, a releasing member extending longitudinally of said arm, a lateral projection carried by said releasing member, and means engageable with said projection whereby to move said releasing member longitudinally of said arm, movement of said releasing member in one direction engaging said combined cam and counter-balancing member whereby to move said marking device to inoperative position.

6. A marking means for recording instruments comprising a pair of elongated rods disposed in parallel planes, pivot means engaging the inner ends of said rods to pivotally secure said members together, a marking device holder for each rod, a marking device on each of said holders, a combined cam and counter-balancing member secured to each holder, means for pivotally securing each combined cam and counter-balancing member to an inner member, a releasing member carried by each rod and movable longitudinally thereof, said releasing member upon outward movement thereof engaging a combined cam and weight member whereby to move a marking device to inoperative position, confronting projections carried by each releasing member, and a single operating means disposed between said rods and engageable with said lateral projections.

7. A marking means for recording instruments comprising an elongated rod, a holder, a marking device carried by said holder, a pin carried by the outer end of said rod, a combined cam and counter-balancing member secured to the inner end of said holder, said combined cam and counter-balancing member having a slot opening through one edge thereof to receive said pin whereby to removably secure said holder on said rod, and releasing means carried by said inner member movable longitudinally thereof and engageable with said combined cam and weight member whereby to move said marking device to inoperative position.

8. A marking means for recording instruments comprising an arm, a holder, a marking device carried by said holder, a pin carried by the outer end of said inner member, a combined cam and counter-balancing member secured to the inner end of said holder, said combined cam and counter-balancing member having a slot opening through one edge thereof to receive said pin whereby to removably secure said holder on said arm, a releasing member, means for slidably mounting said releasing member for movement longitudinally of said inner member whereby outward movement of said releasing member will effect engagement thereof with said combined cam and counter-balancing member to thereby move said marking device to inoperative position, a lateral projection carried by said releasing member, and means engageable with said projection whereby to move said releasing member longitudinally of said arm.

9. A marking means for recording instruments comprising an elongated rod, a marking device holder, a marking device carried by said holder, pivotal means securing the said rod and holder together, cam means carried by said holder and resting on said pivotal means, and means carried by the elongated rod engageable with said cam means whereby to move said marking device to inoperative position.

10. A marking means for recording instruments comprising a marking device arm, a holder, a marking device carried by said holder, said arm having an elongated slot in the outer end thereof, a pin carried by said arm extending across said slot, a combined cam and weight member secured to said holder and engaging said pin to pivotally secure said holder on said arm, a releasing member for said marking device, means for slidably mounting said releasing member on said arm in a position for engagement with said combined cam and weight, a releasing cam, means for mounting said releasing cam in a position for engagement with said releasing member, and resilient means to automatically disengage said releasing cam from engagement with said releasing member.

11. A marking means for recording instruments, an elongated pen arm, a pen holder, a pen carried by said pen holder, counter-balanced cam means pivotally mounting said pen holder on the outer end of said pen arm, and means carried by the pen arm adapted to engage with said counter-balanced cam means whereby to move said pen to inoperative position.

KELVIN K. SHEPARD.